United States Patent [19]

Randen et al.

[11] Patent Number: 5,085,695

[45] Date of Patent: Feb. 4, 1992

[54] PROTECTIVE FURNITURE POLISH COMPOSITION

[75] Inventors: Neil A. Randen; Vinu Patel, both of St. Paul, Minn.

[73] Assignee: Minnesota Mining and Manufacturing Company, St. Paul, Minn.

[21] Appl. No.: 552,318

[22] Filed: Jul. 13, 1990

[51] Int. Cl.$^5$ .................... C08J 3/00; C09G 1/04
[52] U.S. Cl. ............................. 106/8; 106/3; 106/10; 524/269; 524/267; 524/457; 524/458; 524/490; 524/277
[58] Field of Search ................ 106/8, 10, 3; 524/269, 524/267, 458, 490

[56] References Cited

U.S. PATENT DOCUMENTS

| | | | |
|---|---|---|---|
| 2,839,482 | 6/1958 | Geen et al. | 106/6 |
| 3,553,123 | 1/1971 | Behnke | 106/8 |
| 3,979,352 | 9/1976 | Brady et al. | 106/8 |
| 4,317,785 | 3/1982 | Gregory | 106/8 |
| 4,347,333 | 8/1982 | Lohr et al. | 106/10 |

Primary Examiner—Mark L. Bell
Assistant Examiner—C. Melissa Bonner
Attorney, Agent, or Firm—Gary L. Griswold; Walter N. Kirn; Mark A. Litman

[57] ABSTRACT

An essentially wax-free cleaner-polisher composition that cleans while maintaining excellent gloss and superior protection against water and a mixture of alcohol and water damage in a one-step application is described. The composition comprises about, a) 30% to 90% water, b) 1 to 4% by weight acrylate polymer, c) 4% to 12% co-solvent and/or 0.5% to 6% surface active agents, d) 4–40 silicone oil and/or mineral oil and optically, e) 0 to 3 percent by weight of fluoroalkyl polymer, f) 0 to 0.5% a fragrance, and g) 0 to 5 percent by weight of a wax emulsion.

21 Claims, No Drawings

PROTECTIVE FURNITURE POLISH COMPOSITION

BACKGROUND OF THE INVENTION

1. Field of the Invention

The present invention relates to protective coatings for furniture and combination cleaner protective coatings for furniture.

2. Background of the Art

Protective coatings for wood furniture surfaces and the like are designed to protect the underlying surface by filling the crevices and pores therein. These vary from permanent coatings requiring spraying, or brush applications such as shellac, nitrocellulose lacquers, varnish, or polyurethanes to temporary coatings comprising various oils and waxes. The latter usually consist of blends of mineral, vegetable, silicone and/or essential oils and small amounts of waxes. While these oils are easy to apply, they often tend to leave a greasy film and they, like the permanent coatings, do not provide much protection against water and alcohol spotting.

It is desirable for a furniture polish to aid in cleaning and protecting the furniture finish from such common damaging effects as finger marking, food and drink stains, and other surface deposits. They must be easy to apply, to spread, and to buff to a shine, and any excess must be easily removed.

As is known in the literature and the patent art, acrylate polymers are useful in providing protective coatings for flooring substrates where the coating must be able to form a tough film to protect the floor from wear and damage. In addition, polymers have been used in furniture polishes. Two characteristics useful in defining these polymers are their glass transition temperature ($T_g$) and their solubility parameters ($\delta$). Glass temperature is defined as the temperature at which an amorphous material (such as glass or a high molecular weight polymer) changes from a brittle vitreous state to a plastic state. Solubility parameter, $\delta$, is the square root of the cohesive-energy density, CED, which is the amount of energy required to vaporize one cubic centimeter of the hypothesized liquid. The latter is represented thermodynamically as follows $$\delta^2 = \frac{E}{V} = \frac{H_v - RT}{V} = CED \quad (1)$$

where E is the molar energy of vaporization, H is the heat of vaporization per mole, V is the molecular volume, R is the gas constant, and T is temperature.

The solubility parameter, $\delta$, of a solvent is a readily calculable quantity. The solubility parameter of a polymer (or for that matter of any non-volatile substance) cannot be determined directly because most polymers cannot be vaporized without decomposition. The solubility parameter of a polymer is therefore defined as the same as that of a solvent in which the polymer will mix (a) in all proportions, (b) without heat change, (c) without volume change and (d) without reaction or special association. (H. Burrell in J. Brandrup and E. H. Immergut, Ed. *Polymer Handbook*, 2nd ed., Interscience, N.Y., 1975, vol. IV, page 337).

The solubility of a given polymer in various solvents is largely determined by its chemical structure. As a general rule, structural similarity favors solubility; this means that the solubility of a given polymer in a given solvent is favored if the solubility parameters of polymer and solvent are equal or differ by no more than about ±1.5 $(cal/cc)^{\frac{1}{2}}$. (van Krevelen, D. W., *Properties of Polymers: Their estimation and Correlation with Chemical Structure*, Elsevier Scientific Publishing Co., Amsterdam, 1976, page 129).

Solubility parameters are commonly used in polymer science to show solvent classes in which a particular polymer is soluble and is shown on a Solvent Strength Chart such as "Hydrogen Bonding Numbers and Solubility Parameters for Solvents", D. W. von Krevele, *Properties of Polymers, Their Estimation and Correlation With Chemical Structure*, 1976, pp. 582-584, graph p. 145. Solubility parameters are plotted on the X axis and hydrogen bonding character is plotted on the Y axis. As the solubility parameter increases from 7 to 12, the solvent's character changes from non-polar to polar in nature. Correspondingly, as the hydrogen bonding index increases, the solvent changes from poorly hydrogen bonding to strongly hydrogen bonding. Therefore, the most hydrophobic solvents appear in the lower left hand corner of the charts, and the most hydrophilic solvents appear in the upper right hand corner of the chart. Polymers are then tested for solubility in various solvents shown on the charts, and the regions of solubility determined and hence the solubility parameters can be defined for the polymers.

Floor polishes, contain polymers which have high glass transition temperatures because they must form hard surface films which have to stand up to abrasion and abuse. They also have high solubility parameter values because they need to be easily removable with basic soaps and water. In addition, many of these polymers must be made into salts and/or cross linked with di-functional metals in order to raise their effective glass transition temperatures. This also raises their solubility parameters. Those polymers used in floor polishes with their high glass transition temperatures and solubility parameters are not useful in the present invention. In fact, lower values are required for ease of application and film durability.

Polymers similar to those used in this instant invention can be found described in U.S. Pat. Nos. 4,172,122, 4,552,755, 4,816,256 and U.S. application Ser. No. 290,579, filed on Dec. 27, 1988. The polymers used herein, for this new furniture polish, are typically harder, and have higher $T_g$ values, than those described in these patents. The current polymers can contain more of the harder monomers for example methyl methacrylate.

U.S. Pat. No. 3,328,328 describes a water-insolubilized composition containing a styrene-ethyl acrylate-methyl acrylate copolymer and alkali metal aluminate in an emulsion floor wax. The styrene/ethyl acrylate/methacrylic acid polymer has a $T_g$ of 355° K., and a $\delta$ of 9.7 $(cal/cc)^{1/8}$.

Canadian Patent Application Number 198282 (4-26-74) assigned to S. C. Johnson & Sons Inc, describes a floor polish and sealing composition containing an acrylic resin terpolymer of 55–60% methyl methacrylate, 10–15% methacrylic acid and 25–30% butyl acrylate, a polyethylene wax emulsion and water. The described polymers have $T_g$'s from 333°–338° K. and $\delta$ of 11.5–11.6 $(cal/cc)^{\frac{1}{2}}$.

SUMMARY OF THE INVENTION

This invention relates to a chemical composition for treating furniture surfaces, especially wood furniture surfaces, i.e., a wood treatment composition for cleaning, polishing and for reconditioning wood surfaces. The composition includes a) water; b) a dispersion of solvent soluble acrylate polymers with glass transition temperatures, $T_g$, from about 205 to about 273° K., and solubility parameters ($\delta$), values of from about 8.9 to about 10.6 (cal/cc)$^{\frac{1}{2}}$ in poorly hydrogen bonding solvents; c) a co-solvent and/or surface active agent; d) silicone oil or mineral oil; and optionally e) fragrance, f) waxes and g) fluoroalkyl polymers.

DETAILED DESCRIPTION OF THE INVENTION

The improved protective furniture polish composition of the present invention is an oil-in-water or water-in-oil dispersion comprising a) at least one oil-soluble acrylate polymer with a glass transition temperature ($T_g$) of from about 205° to about 273° K. and solubility parameter values in poorly hydrogen bonding solvents from about 8.9 to about 10.6 (cal/cc)$^{\frac{1}{2}}$ incorporated into the oil phase along with b) an organo-silicone oil or mineral oil, c) a co-solvent and/or surface active agents, water, and optionally, fragrances, waxes and/or a fluoroalkyl polymer emulsion. The term "dispersion" as used herein broadly encompasses systems wherein the oil phase is uniformly dispersed throughout the aqueous phase as an emulsion, as a colloidal suspension, as a solute, or a combination thereof, e.g., partially in solution and partially in emulsion form (see U.S. Pat. No. 4,070,510, col.2, lines 33 ff).

The preferred polymers in this furniture polish have solubility parameters between about 8.9 to about 10.6 (cal/cc)$^{\frac{1}{2}}$ in poorly hydrogen bonding solvents (e.g., benzene, chloroform, methylene chloride, nitrobenzene, p-xylene, and toluene). These preferred polymers are further defined as having glass transition temperatures between 205° and 273° K. The solubility parameter dictates the overall polarity requirement of the final polymer and hence, dictates the type of monomer to be used to fit this requirement.

Typically the furniture polish polymers contain less than 80 mole percent hard monomers, less than 80 mole percent fatty monomers, less than 30 mole percent acidic monomers and from about 20 to 90 mole percent soft plus fatty monomers. The ratio of hard monomers to soft monomers is from 0 to 4.0.

In the practice of the present invention, hard monomers are defined as those whose homopolymers are hard at room temperature and have glass transition temperatures ($T_g$) of greater than about 305° K. (30° C.). Examples of these would be methylmethacrylate, ethyl methacrylate and the like. Soft monomers are those whose homopolymers are soft at room temperature and have glass transition temperatures of less than about 295° K. (20° C.). Examples of these would be ethyl, propyl, butyl, amyl, hexyl etc. acrylates and hexyl, octyl, decyl, etc. methacrylates. Fatty monomers are those which have 12 or more carbon atoms, in the alkyl group of the alcohol portion of the ester group. Examples would be dodecyl, tetradecyl, hexyldecyl, octadecyl and the like acrylates and methacrylates. Acidic monomers contain acidic functionality such as a carboxylic acid group therein. Examples would be acrylic acid, methacrylic acid, ethacrylic acid, maleic acid, itaconic acid and the like.

The polymers should have Brookfield viscosities, when measured at 30 percent solids, of from about 50 to about 100,000 cps. Of course when the furniture polish is to be dispersed via an aerosol, then the viscosities will have to be adjusted to the low end of this range to from about 50 to about 3,000 cps.

The preparation of the oil-soluble acrylate polymer is well documented in the literature and can be carried out by standard bulk, solution or emulsion techniques. Generally, the latter two are preferred with solution polymerization being most preferred. The polymerization of the monomers is catalyzed by free radical-generating catalysts such as peroxides, azo catalysts and the like. To be most effective, the reactor for such polymerization should be purged with an inert gas in order to remove traces of oxygen. The solution polymerization is run in a compatible solvent and the final polymer solution preferably contains 25 to 60 percent solids.

The polymers are prepared by combining the monomers, solvent (ethyl acetate) and catalyst (0.5% benzoyl peroxide) in an amber, narrow necked pint bottles at room temperature. The solutions were de-aerated by pulling a vacuum and releasing with nitrogen. The bottles were capped tightly and put in an Atlas launderometer at 60° C. overnight. The bottles were cooled to room temperature and the polymers transferred to clear storage bottles. The polymers in Table I were prepared in this manner.

The preferred tetrapolymer (referred to as 3M oil soluble acrylate tetrapolymer in the examples) is prepared as follows:

A five liter resin flask is charged with 2800.0 parts ethyl acetate (solvent), 56.4 parts acrylic acid (acidic monomer), 529.8 parts stearyl methacrylate (fatty monomer), 144.1 parts iso-octyl acrylate (soft monomer) and 469.8 parts methyl methacrylate (hard monomer). The reactor is sealed, stirring initiated and a vacuum pulled on the flask to degas the polymerization solution. The vacuum is released with nitrogen gas and the degassing process repeated two more times. A nitrogen blanket is maintained over the solution for the remainder of the polymerization. The solution is then heated to 60° C. using heat lamps. At 60° C., 8.5714 grams of 70% benzoyl peroxide is added. The temperature is maintained at 60° C. Ten hours later, 4.2857 grams of benzoyl peroxide is added. Fourteen hours into the polymerization, the solution is heated to 75° C. and 4.2857 grams of benzoyl peroxide is added. Four hours later another 4.2857 gram charge of benzoyl peroxide is added. At twenty-two hours the polymerization solution is allowed to cool to room temperature. The resultant water clear polymer had a Brookfield viscosity of 436 cps.

The following examples are presented to exemplify the preferred embodiments of the invention and should not be construed as limitations thereof. The cleaner-polish compositions in examples I–VIII are prepared by admixing the polymer with the terpene or fragrant oil for approximately thirty minutes. A silicone emulsion may then be added with stirring for an additional thirty minutes. In some examples a fluoroalkyl polymer emulsion and carnauba wax emulsion are added with an additional fifteen minutes of mixing. Water is then added to make up 100 parts of total solution. The composition is then mixed for one hour. The amount of the terpene or fragrant oil containing $\delta$-limonene derivatives added is determined by the degree to which the dispersion maintains stability. Generally, higher levels of the oil-soluble acrylate polymers tend to result in unstable dispersions, while lower levels result in a lower degree of water and alcohol protection of the treated surfaces. Higher levels of the co-solvent or fragrant oils also reduce the protective nature of the coating by diluting the overall effectiveness of the polymer, while lower levels cause the oil-soluble acrylate polymers to coagulate and precipitate out of the composition. While additional emulsifying or dispersing agents are generally not required they may be added to provide a more stable dispersion. We have found that the dispersive ability of the preferred terpene oils, along with silicone emulsions and an optional fluoroalkyl polymer emulsion are quite sufficient to disperse the ingredients of this composition and specifically the acrylate polymers. The silicone emulsions are added to the composition to impart a glossy nature to the polish. One or a combination of silicone emulsions may be added to the composition. The fluoroalkyl polymer emulsion is added for additional water repellency and protection. Additionally, other wax emulsions may be added if a more glossy appearance is desired. The compositions of the polymers used in Examples I–XVIII are listed in Table II.

EXAMPLE I

|  | Parts by wt. |
|---|---|
| 3M oil soluble acrylate tetrapolymer, 30% in ethyl acetate | 10.0 |
| BIOACT TM EC 7 terpene | 10.0 |
| UC Organo Silicone Emulsion, LE 462 HS | 10.0 |
| 30% Fluoroalkyl polymer emulsion FC-214-30 | 8.0 |
| Water | 62.0 |

EXAMPLE II

|  | Parts by wt. |
|---|---|
| 3M oil soluble acrylate tetrapolymer, 30% in ethyl acetate | 10.0 |
| BIOACT TM EC 7 terpene | 10.0 |
| UC Organo Silicone Emulsion, LE 462 HS | 8.0 |
| UC Organo Silicone Emulsion, LE 461 HS | 8.0 |
| Water | 55.0 |
| Carnauba Wax emulsion C-340 | 5.0 |
| 30% 3M Fluoroalkyl polymer emulsion FC214-30 | 4.0 |

EXAMPLE III

|  | Parts by wt. |
|---|---|
| 3M oil soluble acrylate tetrapolymer, 30% in ethyl acetate | 6.2 |
| BIOACT TM EC 7 terpene | 6.2 |
| UC Organo Silicone Emulsion, LE 462 HS | 9.25 |
| UC Organo Silicone Emulsion, LE 461 HS | 9.25 |
| UC Organo Silicone Emulsion, LE 45 | 9.25 |
| 30% 3M Fluoroalkyl polymer emulsion FC214-30 | 0.64 |
| Water | 59.21 |

EXAMPLE IV

|  | Parts by wt. |
|---|---|
| 3M oil soluble acrylate tetrapolymer, 30% in ethyl acetate | 10.0 |
| BIOACT TM EC 7 terpene | 10.0 |
| UC Organo Silicone Emulsion, LE 462 HS | 10.0 |
| UC Organo Silicone Emulsion, LE 461 HS | 10.0 |
| UC Organo Silicone Emulsion, LE 45 | 10.0 |
| Water | 50.0 |

EXAMPLE V

|  | Parts by wt. |
|---|---|
| 3M oil soluble acrylate tetrapolymer, 30% in ethyl acetate | 6.2 |
| Glidco Pine Oil 155 | 6.2 |
| UC Organo Silicone Emulsion, LE 462 HS | 9.2 |
| UC Organo Silicone Emulsion, LE 461 HS | 9.2 |
| UC Organo Silicone Emulsion, LE 45 | 9.2 |
| Water | 60.0 |

EXAMPLE VI

|  | Parts by wt. |
|---|---|
| 3M oil soluble acrylate tetrapolymer, 30% in ethyl acetate | 6.2 |
| Lemon oil Felton 3075 | 6.2 |
| UC Organo Silicone Emulsion, LE 462 HS | 9.2 |
| UC Organo Silicone Emulsion, LE 461 HS | 9.2 |
| UC Organo Silicone Emulsion, LE 45 | 9.2 |
| Water | 60.0 |

EXAMPLE VII

|  | Parts by wt. |
|---|---|
| 3M oil soluble acrylate tetrapolymer, 30% in ethyl acetate | 6.2 |
| Turpentine Oil | 6.2 |
| UC Organo Silicone Emulsion, LE 462 HS | 9.2 |
| UC Organo Silicone Emulsion, LE 461 HS | 9.2 |
| UC Organo Silicone Emulsion, LE 45 | 9.2 |
| Water | 60.0 |

EXAMPLE VIII

|  | Parts by wt. |
|---|---|
| 3M oil soluble acrylate tetrapolymer, 30% in ethyl acetate | 6.2 |
| Tangerine Oil | 6.2 |
| UC Organo Silicone Emulsion, LE 462 HS | 9.2 |
| UC Organo Silicone Emulsion, LE 461 HS | 9.2 |
| UC Organo Silicone Emulsion, LE 45 | 9.2 |
| Water | 60.0 |

The cleaner-polish composition of examples IX to XVI are prepared by combining the mineral oil, TWEEN 80 TM, SPAN 80 TM, fragrant oil, oil soluble acrylate polymer in one vessel. The mixture is heated with agitation to about 65° C. to form a solution. The water is then charged slowly at 65° C. to the solution with continuous agitation. The heating and agitation are continued for about one hour or until the solution appears to be homogeneous. The solution was then allowed to cool at room temperature with continuous stirring.

EXAMPLE IX

|  | Parts by wt. |
|---|---|
| 3M oil soluble acrylate tetrapolymer, 30% in ethyl acetate | 7.0 |
| Lemon oil 3075 | 0.5 |
| Klearol Mineral oil | 28.0 |
| TWEEN 80 TM | 1.0 |
| SPAN 80 TM | 3.0 |

-continued

|  | Parts by wt. |
|---|---|
| Water | 60.5 |

EXAMPLE X

|  | Parts by wt. |
|---|---|
| 3M oil soluble acrylate tetrapolymer, 30% in ethyl acetate | 6.3 |
| Lemon oil Felton 3075 | 0.5 |
| Klearol Mineral oil | 35.88 |
| TWEEN 80 TM | 1.0 |
| SPAN 80 TM | 2.88 |
| Water | 53.44 |

EXAMPLE XI

|  | Parts by wt. |
|---|---|
| 3M oil soluble acrylate tetrapolymer, 30% in ethyl acetate | 5.0 |
| Lemon oil Felton 3075 | 0.5 |
| Klearol Mineral oil | 21.0 |
| TWEEN 80 TM | 1.0 |
| SPAN 80 TM | 1.5 |
| Water | 71.0 |

EXAMPLE XII

|  | Parts by wt. |
|---|---|
| 3M oil soluble acrylate tetrapolymer, 30% in ethyl acetate | 7.0 |
| Lemon oil Felton 3075 | 0.5 |
| Klearol Mineral oil | 28.0 |
| TWEEN 80 TM | 1.0 |
| SPAN 80 TM | 3.0 |
| Water | 60.5 |

EXAMPLE XIII

|  | Parts by wt. |
|---|---|
| 3M oil soluble acrylate tetrapolymer, 30% in ethyl acetate | 7.0 |
| Lemon oil Felton 3075 | 0.5 |
| Klearol Mineral oil | 28.0 |
| TWEEN 80 TM | 1.0 |
| SPAN 80 TM | 3.0 |
| Water | 60.5 |

EXAMPLE XIV

|  | Parts by wt. |
|---|---|
| 3M oil soluble acrylate tetrapolymer, 30% in ethyl acetate | 7.0 |
| Glidco Pine Oil 155 | 0.5 |
| Klearol Mineral oil | 28.0 |
| TWEEN 80 TM | 1.0 |
| SPAN 80 TM | 3.0 |
| Water | 60.5 |

EXAMPLE XV

|  | Parts by wt. |
|---|---|
| 3M oil soluble acrylate tetrapolymer, 30% in ethyl acetate | 7.0 |
| Lemon oil Felton 3075 | 0.5 |
| Klearol Mineral oil | 28.0 |
| TWEEN 80 TM | 1.0 |
| SPAN 80 TM | 3.0 |
| Water | 60.0 |
| Germaben II | 0.5 |

EXAMPLE XVI

|  | Parts by wt. |
|---|---|
| 3M oil soluble acrylate tetrapolymer, 30% in ethyl acetate | 7.0 |
| Glidco Pine Oil 155 | 0.5 |
| Klearol Mineral oil | 28.0 |
| TWEEN 80 TM | 1.0 |
| SPAN 80 TM | 3.0 |
| Water | 60.0 |
| Formalin 37% aqueous solution | 0.5 |

The cleaner-polish composition of Examples XVII and XVIII were prepared by mixing the terpene oil, acrylate polymer, mineral oil and odorless kerosene in a vessel. The mixture was then heated to 65° C. for one hour with agitation to form a clear solution. The solution was then allowed to cool at room temperature with continuous stirring.

EXAMPLE XVII

|  | Parts by wt. |
|---|---|
| 3M oil soluble acrylate tetrapolymer, 30% in ethyl acetate | 6.2 |
| Lemon Oil Felton 3075 | 6.2 |
| Klearol Mineral oil | 27.6 |
| Odorless kerosene | 60.0 |

EXAMPLE XVIII

|  | Parts by wt. |
|---|---|
| 3M oil soluble acrylate tetrapolymer, 30% in ethyl acetate | 6.2 |
| BIOACT TM EC 7 terpene | 6.2 |
| Klearol Mineral oil | 27.6 |
| Odorless kerosene | 60.0 |

The cleaner-polish composition may be applied by spraying with a pump type spray dispenser or by charging the polish into an aerosol spray can using conventional techniques. The composition may also be applied by wiping or brushing with a cloth, brush or sponge. The preferred method of application is by aerosol spray. The general practice for applying this composition is to shake the container well before using, and, holding the container in an upright position, and then spraying the composition onto the surface from a distance of approximately 15.24 centimeters (six inches). The surface is immediately wiped with a clean soft absorbent cloth. The surface may be buffed additionally to the desired shine. Alternately, the spray may be directed to a soft absorbent cloth and the thus treated cloth wiped onto the surface to be cleaned and polished.

Ethyl acetate-solvent for the acrylate tetrapolymer.

Silicone Emulsions are dimethyl siloxane compounds and are available from the Union Carbide Corporation of South Charleston, WV, under the trade designations of Union Carbide Silicone Emulsions LE 462 HS, LE 461 HS, and LE 45.

The fluoroalkyl polymer emulsion, FC-214-30, is available from the 3M Company, St. Paul, Minn.

The wax emulsion is a wax and water emulsion. Typically the wax is heated with a surfactant (emulsifying agent) or a fatty acid such as Oleic acid and then reacted with a neutralizing amine such as diethyl amine. Water is then mixed into the mixture and heated for a given period of time. Such wax-water emulsions are available from the EXXON Chemical Company of Milton, WI as Carnuba Wax emulsion C-340.

BIOACT ™ EC7 (δ-limonene, is an optically active terpene and can be used as a solvent, fragance, dispersant and wetting agent), and is available from Petroferm Inc, Fernandina Beach, FL.

Glidco Pine oil 155 is available from SCM Glidco, Jacksonville, FL.

Klearol mineral oil is available from Witco Corp, Sonneborn Division, New York, NY Lemon Oil, Felton 3075 is available from Felton Worldwide, Inc., Brooklyn, NY TWEEN ™ 80 is polyoxyethylene sorbitan monooleate and SPAN ™ 80 is sorbitan monooleate. Both are nonionic surface active agents, and are available from ICI Specialty Chemicals, Wilmington, DE.

Germaben ™ II is a biocide and is comprised of a mixture of diazolidinyl urea, methylparaben and propylparaben in propylene glycol, available from Sutton Labs Inc., Chatham, NJ.

TEST METHODS

The furniture polishes of the above examples were tested for resistance to water and alcohol-water mixture spills and compared to the commercially available products. Each of the examples and the commercial products were applied individually to smooth cherry, maple and oak wood surfaces which had been previously finished with two coats of 20% to 25% Silver Label No. 1001 Semigloss Ember Lacquer available from Star Chemical Inc. of Hinsdale, IL. The lacquer was diluted to 20%-25% using a commercially available lacquer thinner. The polish was applied by shaking the container well, and, holding the container in an upright position to spray the composition onto the surface from a distance of approximately 15.24 centimeters (six inches). The surface was immediately wiped with a clean soft absorbent cloth. The surface may be buffed additionally to the desired shine. The polishes were allowed to dry at room temperature for a minimum of thirty to sixty minutes prior to the water and alcohol/water mixture (50:50 and 25:75 ethanol:water) challenge. Two milliliters of water and the alcohol/water mixture spots are placed on four areas of the polished surface. The challenge spots spread to about two centimeters. A glass bottle with a base of approximately 2.45 centimeters in diameter and weighing approximately 40 grams was placed on each challenge spot to avoid any water evaporation. The challenge spot and the bottle remained on the spots for one, three, six and sixteen hours at room temperature. At the specified intervals, the bottles were removed and the excess liquid absorbed from the surfaces with a paper towel or other absorbent material. The surfaces were blotted and not wiped to avoid surface smearing. The cleaner-polishes of examples I to XVIII were much more resistant to water and water/alcohol mixture damage than were the commercially available furniture polishes. The data can be found in Table II. In addition, the novel furniture polishes of examples I to XVIII appear to be equal to and usually better than commercially available furniture polishes with respect to other properties such as cleaning of oil borne deposits, gloss properties, etc.

The observations relating to the cleaning of the cleaner/polish follow the standard test method outlined in ASTM D 3751-79 (reapproved 1985).

TABLE I

| | | Acrylate Polymers | | | | |
|---|---|---|---|---|---|---|
| | | Mole Ratio | | | Percent | Polymer |
| MA | AA | SMA | IOA | MMA | Monomer | Viscosity |
| 2 | — | 20 | 2 | 76 | 30 | 182 |
| 10 | — | 10 | 10 | 70 | 30 | 586 |
| 2 | — | 20 | 10 | 68 | 30 | 150 |
| 10 | — | 20 | 10 | 60 | 30 | 336 |
| 6 | — | 15 | 6 | 73 | 30 | 250 |
| 10 | — | 20 | 2 | 68 | 30 | 378 |
| — | 10 | 20 | 10 | 60 | 30 | 272 |
| — | — | 25 | 14 | 61 | 30 | 100 |
| — | — | 22.2 | 11.1 | 66.7 | 30 | 2,980 |
| — | — | — | 35 | 65 | 30 | 456 |
| — | — | — | 45 | 55 | 30 | 796 |
| — | — | — | 55 | 45 | 30 | 260 |
| — | — | 25 | — | 75 | 30 | 248 |
| — | — | 35 | — | 65 | 30 | 156 |
| — | — | 45 | — | 55 | 30 | 130 |
| — | — | 55 | — | 45 | 30 | 142 |
| — | — | 65 | — | 35 | 30 | 73 |
| — | — | 75 | — | 25 | 30 | 81 |
| — | 20 | 60 | 20 | — | 30 | 345 |
| — | 30 | 50 | 20 | — | 30 | 380 |
| — | 20 | 50 | 30 | — | 30 | 164 |
| — | 30 | 40 | 30 | — | 30 | 427 |
| — | 25 | 50 | 25 | — | 30 | 200 |
| — | — | 30 | 18 | 52 | 30 | 110 |
| — | 2 | 20 | 10 | 68 | 30 | 150 |
| — | 10 | 20 | 10 | 60 | 30 | 264 |
| — | 5.3 | 21.1 | 10.5 | 63.2 | 30 | 188 |
| — | — | 22.2 | 11.1 | 66.7 | 30 | 120 |
| — | 10 | 20 | 10 | 60 | 32 | 156 |
| — | 10 | 20 | 10 | 60 | 34 | 2,855 |
| — | 10 | 20 | 10 | 60 | 42 | 48,600 |
| — | 10 | 20 | 10 | 60 | 46 | 730,000 |

MAA = methacrylic acid - acidic monomer
AA = acrylic acid - acidic monomer
SMA = stearyl methacrylate - fatty monomer
IOA = iso octyl acrylate - soft monomer
MMA = methyl methacrylate - hard monomer

TABLE II

| | Water Damage Results | |
|---|---|---|
| Examples | Mole Ratio of AA:SMA:IOA:MMA* | Experimental/ Commercial** |
| I | 10:20:10:60 | None to V V S1/Moderate |
| II | 10:20:10:60 | None to V V S1/Moderate |
| III | 10:20:10:60 | 2.33/4.33 |
| IV | 10:20:10:60 | 1.5/3.25 |
| V | 10:20:10:60 | 2.08/2.92 |
| VI | 10:20:10:60 | 1.5/3.42 |
| VII | 10:20:10:60 | 1.83/2.83 |
| VIII | 10:20:10:60 | 1.58/2.67 |
| IX | 10:20:10:60 | 2.25/4.08 |
| X | 10:20:10:60 | 2.42/4.66 |
| XI | 10:20:10:60 | 2.5/4.0 |
| XII | 0:55:0:45 or | 1.58/2.67 or |
| | 0:25:0:75 or | 1.67/2.67 or |
| | 0:0:55:45 | 2.67/3.5 |
| XIII | 25:50:25:0 or | 1.92/3.58 or |
| | 0:25:14:61 | 2.25/3.33 |
| XIV | 10:20:10:60 | 1.75/3.17 |
| XV | 10:20:10:60 | 1.5/3.25 |
| XVI | 10:20:10:60 | 2.25/3.75 |

TABLE II-continued

| | Water Damage Results | |
|---|---|---|
| Examples | Mole Ratio of AA:SMA:IOA:MMA* | Experimental/ Commercial** |
| XVII | 10:20:10:60 | 1.92/3.5 |
| XVIII | 10:20:10:60 | 2.33/3.5 |

*Acrylic Acid:Stearyl Methacrylate:Iso-octyl Acrylate:Methyl Methyl Acrylate (acidic monomer, fatty monomer, soft monomer, hard monomer)
**Water Damage Test Results Evaluation Criteria
1 = None
2 = V;V Slight
3 = Slight
4 = Fair to Moderate
5 = Severe

We claim:

1. A cleaning and polishing composition for wood furniture comprising, by weight of the total composition of:
   a) at least 30% water,
   b) 1 to 4% an oil-soluble acrylate polymer with a glass transition temperature of 205° to 273° K. and solubility parameters value in poorly hydrogen bonding solvents of about 8.9 to 10.6 (calories/cc)$^{\frac{1}{2}}$,
   c) 4–40% of an oil selected from the class consisting of organo-silicone oil, mineral oil, vegetable oil and other essential oils, and
   d) at least one further additive selected from the group consisting of 4 to 12% of co-solvent for said water and acrylate polymer and 0.5 to 6% of surface active agent.

2. The composition of claim 1 containing less than 5% by weight of wax.

3. The composition of claim 1 containing a fluoralkyl polymer in an amount less than 3% by weight of said composition.

4. The composition of claim 2 containing a fluoralkyl polymer in an amount less than 3% by weight of said composition.

5. The composition of claim 1 containing a wax emulsion in an amount up to 5% by weight of said composition.

6. The composition of claim 1 containing a fragrance in an amount up to 0.5% of said composition.

7. The composition of claim 2 containing a fragrance in an amount up to 0.5% of said composition.

8. The composition of claim 4 containing a fragrance in an amount up to 0.5% of said composition.

9. The composition of claim 1 containing in addition to said oil, terpene in an amount up to 10% by weight of said composition.

10. The composition of claim 2 containing in addition to said oil, terpene in an amount up to 10% by weight of said composition.

11. The composition of claim 4 containing in addition to said oil, terpene in an amount up to 10% by weight of said composition.

12. The composition of claim 5 containing in addition to said oil, terpene in an amount up to 10% by weight of said composition.

13. The composition of claim 8 containing in addition to said oil, terpene in an amount up to 10% by weight of said composition.

14. The composition of claim 1 wherein said further additive comprises 4–12% of co-solvent for said water and acrylate polymer.

15. The composition of claim 2 wherein said further additive comprises 4–12% of co-solvent for said water and acrylate polymer.

16. The composition of claim 3 wherein said further additive comprises 4–12% of co-solvent for said water and acrylate polymer.

17. The composition of claim 5 wherein said further additive comprises 4–12% of co-solvent for said water and acrylate polymer.

18. The composition of claim 9 wherein said further additive comprises 4–12% of co-solvent for said water and acrylate polymer.

19. The composition of claim 1 wherein said further additive comprises 0.5 to 6% of surface active agent.

20. The composition of claim 5 wherein said further additive comprises 0.5 to 6% of surface active agent.

21. The composition of claim 4 wherein said further additive comprises 4–12% of co-solvent for said water and acrylate polymer.

* * * * *

UNITED STATES PATENT AND TRADEMARK OFFICE
CERTIFICATE OF CORRECTION

PATENT NO. : 5,085,695
DATED : February 4, 1992
INVENTOR(S) : Neil A. Randen et al.

It is certified that error appears in the above-identified patent and that said Letters Patent is hereby corrected as shown below:

On the title page,
Abstract, Line 8: "4-40" should be -- 4-40% --

Col. 2, line 56  "(cal/cc)$^{178}$" should be -- (cal/cc)$^{1/2}$ --

Col. 5, line 66  "LE 45" should be -- LE 45 HS --

Col. 6, line 45  "LE 45" should be -- LE 45 HS --

Col. 7, line 36  "tetrapolymer" should be -- co-polymer --

Col. 7, line 49  "tetrapolymer" should be -- terpolymer --

Signed and Sealed this

Eighth Day of February, 1994

Attest:

BRUCE LEHMAN

Attesting Officer

Commissioner of Patents and Trademarks